(12) United States Patent
Moshavi et al.

(10) Patent No.: US 8,913,700 B1
(45) Date of Patent: Dec. 16, 2014

(54) HIGH-PERFORMANCE DIAGONAL LOADING FOR MMSE EQUALIZATION

(71) Applicant: Marvell International, Ltd., Hamilton (BM)

(72) Inventors: Shimon Moshavi, Bet Shemesh (IL); Ram Sever, Petach Tikvah (IL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/061,805

(22) Filed: Oct. 24, 2013

Related U.S. Application Data

(60) Provisional application No. 61/720,769, filed on Oct. 31, 2012.

(51) Int. Cl.
*H04B 7/10* (2006.01)
*H04L 1/02* (2006.01)
*H04L 25/02* (2006.01)
*H04L 25/03* (2006.01)

(52) U.S. Cl.
CPC ........ *H04L 25/03885* (2013.01); *H04L 25/021* (2013.01); *H04L 25/0256* (2013.01)
USPC .......................... 375/347; 375/229; 375/232

(58) Field of Classification Search
CPC ..... H04L 25/021; H04L 27/2674; H04L 1/06; H04B 7/005
USPC .................. 375/229–236, 346–350
See application file for complete search history.

(56) References Cited

U.S. PATENT DOCUMENTS

2012/0140808 A1* 6/2012 Dua et al. ...................... 375/224

* cited by examiner

*Primary Examiner* — Curtis Odom

(57) ABSTRACT

A method includes, in a mobile communication terminal, receiving downlink signals from at least two antennas. A signal covariance matrix for the received signals is calculated. Each diagonal element of the signal covariance matrix is enlarged by a respective antenna-specific value that depends on a respective antenna associated with the diagonal element. Equalizer coefficients are computed based on the signal covariance matrix having the enlarged diagonal elements. The received downlink signals are equalized using the equalizer coefficients.

20 Claims, 2 Drawing Sheets

HIGH-PERFORMANCE DIAGONAL LOADING FOR MMSE EQUALIZATION

CROSS-REFERENCE TO RELATED APPLICATIONS

This application claims the benefit of U.S. Provisional Patent Application 61/720,769, filed Oct. 31, 2012, whose disclosure is incorporated herein by reference.

FIELD OF THE DISCLOSURE

The present disclosure relates generally to communication systems, and particularly to methods and systems for signal processing in receivers.

BACKGROUND

Minimum Mean Square Error (MMSE) equalization is a popular technique used in communication receivers, for example in order to mitigate multipath fading. MMSE equalizers are in common use, for example, in Wideband Code Division Multiple Access (WCDMA) receivers. The estimation of MMSE equalizer taps is often highly sensitive to estimation error of the received signal correlation.

The description above is presented as a general overview of related art in this field and should not be construed as an admission that any of the information it contains constitutes prior art against the present patent application.

SUMMARY

An embodiment that is described herein provides a method including, in a mobile communication terminal, receiving downlink signals from at least two antennas. A signal covariance matrix for the received signals is calculated. Each diagonal element of the signal covariance matrix is enlarged by a respective antenna-specific value that depends on a respective antenna associated with the diagonal element. Equalizer coefficients are computed based on the signal covariance matrix having the enlarged diagonal elements. The received downlink signals are equalized using the equalizer coefficients.

In some embodiments, enlarging each diagonal element by an antenna-specific value that depends on the respective antenna includes calculating the antenna-specific value for each of the antennas independently of any other of the antennas. In an embodiment, enlarging each diagonal element includes scaling each diagonal element by a factor that is proportional to a power gain of the respective antenna. Additionally or alternatively, enlarging each diagonal element includes scaling each diagonal element by a factor that depends on a noise variance in a receiver chain of the respective antenna.

In another embodiment, receiving the downlink signals includes applying Automatic Gain Control (AGC) independently for each antenna so as to produce gain-controlled signals, and calculation of the signal covariance matrix and equalization of the downlink signals are performed on the gain-controlled signals. In yet another embodiment, enlarging each diagonal element includes adapting a single diagonal loading factor based on the equalized downlink signals, and setting each diagonal element by scaling the adapted diagonal loading factor by the antenna-specific value that depends on the respective antenna.

In still another embodiment, the method includes evaluating a predefined criterion and deciding, based on the criterion, to switch to a mode in which all diagonal elements of the signal covariance matrix are enlarged by a same value. In another embodiment, the method includes evaluating a predefined criterion and deciding, based on the criterion, to switch to a mode in which all diagonal elements of the signal covariance matrix are not enlarged.

There is additionally provided, in accordance with an embodiment that is described herein, apparatus including a receiver front-end and processing circuitry. The receiver front-end is configured to receive downlink signals from at least two antennas. The processing circuitry is configured to calculate a signal covariance matrix for the received signals, to enlarge each diagonal element of the signal covariance matrix by a respective antenna-specific value that depends on a respective antenna associated with the diagonal element, to compute equalizer coefficients based on the signal covariance matrix having the enlarged diagonal elements, and to equalize the received downlink signals using the equalizer coefficients.

In some embodiments, a mobile communication terminal includes the disclosed apparatus. In some embodiments, a chipset for processing signals in a mobile communication terminal includes the disclosed apparatus.

There is also provided, in accordance with an embodiment that is described herein, a method including, in a mobile communication terminal, receiving downlink signals from at least two antennas. A signal covariance matrix for the received signals is calculated. A predefined criterion is evaluated. Based on the criterion, a choice is made between enlarging each diagonal element of the signal covariance matrix by a respective antenna-specific value that depends on a respective antenna associated with the diagonal element, and enlarging each diagonal element of the signal covariance matrix regardless of the respective antenna associated with the diagonal element. Equalizer coefficients are computed based on the signal covariance matrix having the enlarged diagonal elements. The received downlink signals are equalized using the equalizer coefficients.

There is further provided, in accordance with an embodiment that is described herein, apparatus including a receiver front-end and processing circuitry. The receiver front-end is configured to receive downlink signals from at least two antennas. The processing circuitry is configured to calculate a signal covariance matrix for the received signals, to evaluate a predefined criterion, to choose, based on the criterion, between enlarging each diagonal element of the signal covariance matrix by a respective antenna-specific value that depends on a respective antenna associated with the diagonal element, and between enlarging each diagonal element of the signal covariance matrix regardless of the respective antenna associated with the diagonal element, to compute equalizer coefficients based on the signal covariance matrix having the enlarged diagonal elements, and to equalize the received downlink signals using the equalizer coefficients.

The present disclosure will be more fully understood from the following detailed description of the embodiments thereof, taken together with the drawings in which:

DETAILED DESCRIPTION OF EMBODIMENTS

Figure 1:
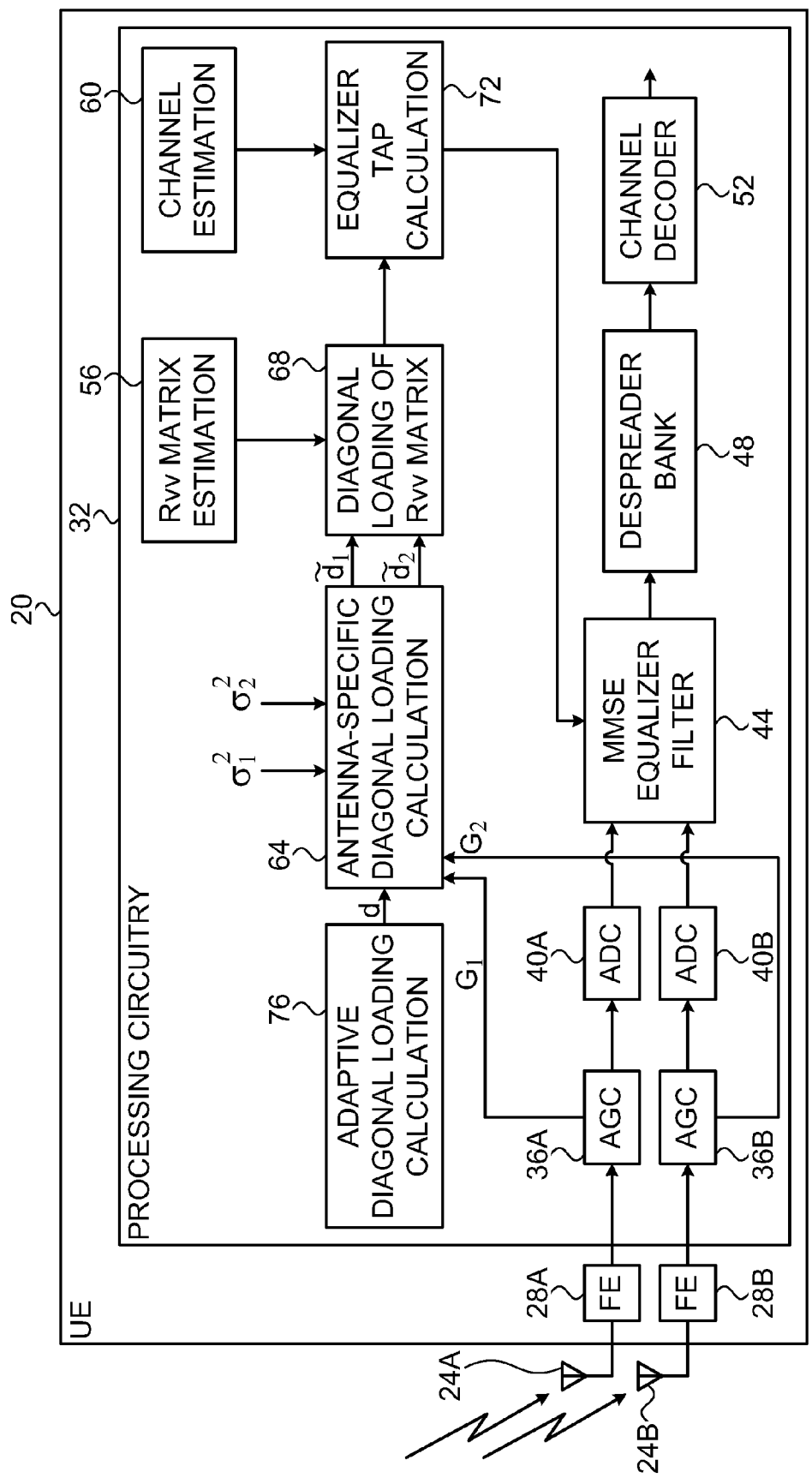
FIG. 1 is a block diagram that schematically illustrates a mobile communication terminal, in accordance with an embodiment that is described herein.

Embodiments that are described herein provide improved methods and systems for signal equalization in communication receivers. In some embodiments, a receiver comprises multiple receive antennas, and an adaptive equalizer that equalizes the signals received via the antennas. The receiver calculates the equalizer taps in accordance with a Minimum Mean Square Error (MMSE) criterion, using an estimate of the covariance matrix of the signals received via the multiple antennas.

In many practical scenarios, the equalizer tap calculation is extremely sensitive to estimation errors in the signal covariance matrix. In order to reduce this sensitivity, in an embodiment, the receiver enlarges the diagonal elements of the signal covariance matrix in a process that is referred to as "diagonal loading."

In the embodiments described herein, the receiver performs diagonal loading separately for the diagonal elements associated with each antenna among two or more antennas. In other words, the receiver enlarges each diagonal element of the signal covariance matrix by a respective antenna-specific value that depends on the antenna associated with that diagonal element.

Antenna-specific diagonal loading provides superior performance in various scenarios. For example, in some embodiments the receiver performs Automatic Gain Control (AGC) independently per antenna. Although independent AGC control optimizes the gain and noise performance per antenna, it causes the MMSE equalizer with non-antenna specific diagonal loading to deviate from the desired Maximum Ratio Combining (MRC) in flat-fading scenarios, and may considerably degrade the equalization performance.

As will be explained in detail below, antenna-specific diagonal loading is able to mitigate, and in some cases even prevent, the performance degradation caused by independent AGC control. The disclosed techniques effectively cause the diagonal loading to perform similarly to the case of joint AGC control. As a result, both gain and noise performance and equalization performance can be optimized jointly.

Several examples of antenna-specific diagonal loading schemes are discussed and demonstrated herein. The disclosed schemes set the diagonal loading values based on factors such as the AGC gain (also referred to as power gain) and/or noise variance in the respective antennas. Some schemes assume that noise variance is similar in the different antennas, while other schemes do not rely on this assumption.

In some disclosed embodiments, adaptation and loading of the diagonal matrix elements are handled as two separate tasks. In these embodiments, the receiver runs a single adaptation loop that adapts a diagonal loading factor. The receiver then enlarges each of the adapted diagonal elements depending on its associated antenna, whereas the adapted diagonal loading factor is scaled by an antenna-specific value that depends on the respective antenna. This technique simplifies the receiver design and reduces computational complexity.

In other disclosed embodiments, the receiver adaptively switches between antenna-specific and non-antenna-specific diagonal loading as appropriate. This sort of mode switching enables the receiver to optimize its operation to the actual signal and/or channel scenario.

FIG. 1 is a block diagram that schematically illustrates a mobile communication terminal 20, also referred to as User Equipment (UE), in accordance with an embodiment that is described herein. In the embodiments described herein, UE 20 communicates with base stations in a cellular network using Wideband Code Division Multiple Access (WCDMA) in accordance with the Universal Mobile Telecommunications System (UMTS) specifications. The disclosed techniques, however, are applicable to various other communication protocols, such as Long Term Evolution (LTE) or other protocols used in suitable cellular networks.

In the embodiment of FIG. 1, UE 20 comprises two receiver chains for receiving downlink signals from base stations (not shown in the figure). A first receiver chain comprises an antenna 24A, a receiver Front-End (FE) 28A (also referred to simply as a receiver for brevity), an Automatic Gain Control (AGC) unit 36A and an Analog-to-Digital Converter (ADC) 40A. A second receiver chain similarly comprises an antenna 24B, a FE 28B, an AGC unit 36B and an ADC 40B. Although the embodiments described herein refer mainly to two receiver chains, the disclosed techniques can be generalized and used with a larger number of receiver chains.

In each receiver chain, the respective antenna receives a downlink signal, the FE down-converts the received signal to baseband and typically performs additional functions such as filtering and amplification. The respective AGC unit adjusts the signal gain, and the respective ADC then digitizes the baseband signal. In one embodiment, the AGC units operate independently of one another, i.e., each AGC unit adjusts the gain of its respective receiver chain regardless of the other chain. In another embodiment, the AGC units apply the same gain adjustment in both receiver chains. These two implementations are referred to herein as "dual AGC" and "single AGC," respectively.

In the present embodiment, UE 20 comprises processing circuitry 32 that comprises the AGC units and ADCs, plus additional elements that are described below. Processing circuitry 32 carries out the various digital processing tasks of the UE. In the present context, however, only the elements relating to the disclosed techniques are shown and described, for the sake of clarity.

In some embodiments, processing circuitry 32 comprises an adaptive MMSE equalizer filter 44, referred to below as an equalizer for brevity. Equalizer 44 filters the signal produced by ADCs 40A and 40B using a set of configurable taps (coefficients). A de-spreader bank 48 de-spreads the CDMA Direct Sequence (DS) codes of the various channels of the equalized WCDMA signal. A channel decoder 52 then decodes the various channels so as to recover the data they convey.

In an embodiment, the taps of equalizer 44 are set in accordance with an MMSE criterion. For this purpose, processing circuitry thus comprises a signal covariance matrix estimation unit 56 and a channel estimation unit 60. Unit 56 estimates a signal covariance matrix denoted $R_{vv}$. Unit 60 estimates a channel response matrix denoted H. Based on the two matrices, an equalizer tap calculation unit 72 calculates and sets the taps of equalizer 44.

In practice, the equalizer tap calculation is often highly sensitive to estimation error in the signal covariance matrix $R_{vv}$. In an embodiment, in order to improve and stabilize the equalizer tap calculation, processing circuitry 32 applies diagonal loading to matrix $R_{vv}$, using techniques that are described in detail herein.

In an embodiment, processing circuitry 32 comprises an antenna-specific diagonal loading calculation unit 64, which calculates antenna-specific diagonal loading values to be applied to the diagonal elements of $R_{vv}$. The term "antenna-specific diagonal loading" means that each diagonal loading value is calculated depending on the respective antenna associated with that diagonal element. Thus, diagonal elements relating to different antennas (different receiver chains) are typically assigned different diagonal loading values in an embodiment. Processing circuitry 32 comprises a diagonal loading unit 68, which applies the diagonal loading values produced by unit 64 to the diagonal elements of matrix $R_{vv}$. The loaded signal covariance matrix is then provided to equalizer tap calculation unit 72. In some embodiments that are described further below, processing circuitry comprises an adaptive diagonal loading calculation unit 76, which carries out adaptive diagonal loading—This functionality is also explained in detail below.

The UE configuration shown in FIG. 1 is an example configuration, which is depicted solely for the sake of clarity. In alternative embodiments, any other suitable UE configuration can be used. For example, the functional partitioning among the various units in processing circuitry 32 is given entirely by way of example. In alternative embodiments, the tasks of the processing circuitry may be performed using any other suitable configuration of any desired number of units.

Some UE elements that are not mandatory for understanding of the disclosed techniques, for example transmission circuitry of the UE, have been omitted from the figures for the sake of clarity. The different UE elements are typically implemented using dedicated hardware, such as using one or more Application-Specific Integrated Circuits (ASICs), Radio frequency Integrated Circuits (RFICs) and/or Field-Programmable Gate Arrays (FPGAs). Alternatively, some UE elements may be implemented using software executing on programmable hardware, or using a combination of hardware and software elements.

In some embodiments, some elements of UE 20 may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
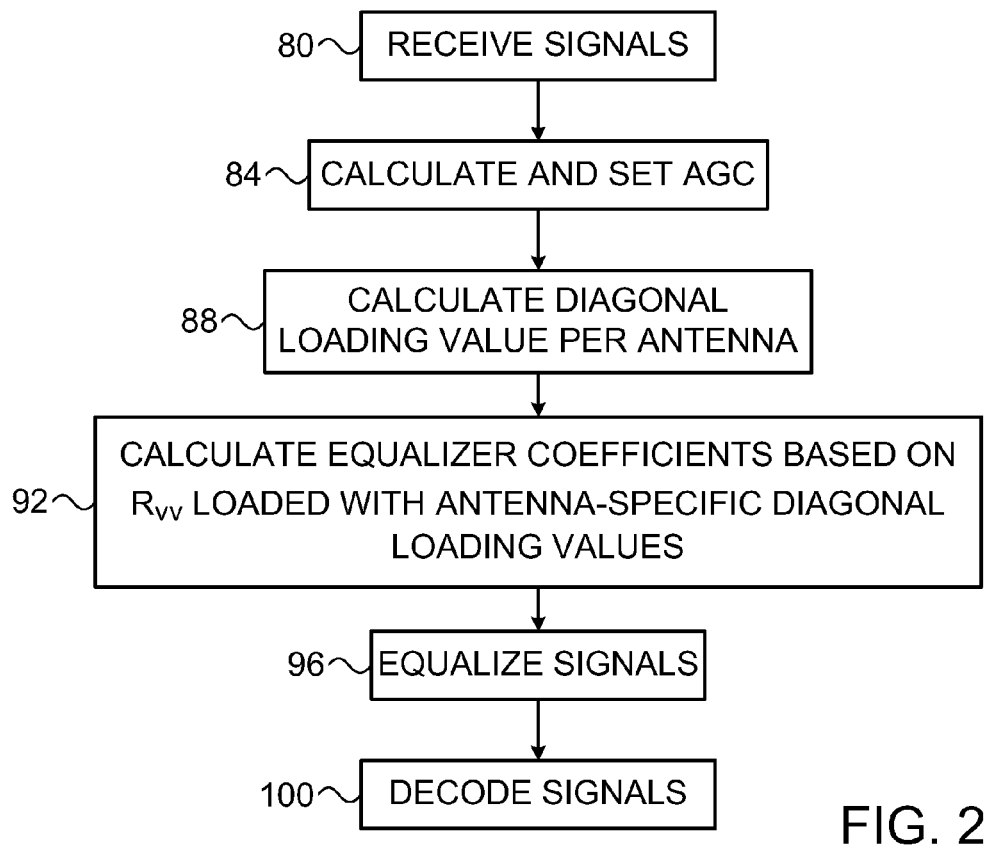
FIG. 2 is a flow chart that schematically illustrates a method for signal reception and equalization using antenna-specific diagonal loading, in accordance with an embodiment that is described herein.

FIG. 2 is a flow chart that schematically illustrates a method for signal reception and equalization using antenna-specific diagonal loading, in accordance with an embodiment that is described herein. The method begins with receiver front-ends 28A and 28B of UE 20 receiving downlink signals, at a reception operation 80.

AGC units 36A and 36B calculate and set the appropriate AGC gains, at an AGC operation 84. Gain calculation may be performed using the single-AGC approach or dual-AGC approach, as explained above. Diagonal loading calculation unit 64 calculates antenna-specific diagonal loading values per antenna, at a loading operation 88.

Equalizer tap calculation unit 72 calculates and configures the taps for equalizer 44 based on the loaded signal covariance matrix, at an equalizer setting operation 92. Equalizer 44 equalizes the received signals using the configured taps, at an equalization operation 96. Channel decoder 52 then decodes the equalized signals, at a decoding operation 100.

In an embodiment, the signal vector received from one of the antennas can be written as Equation 1:

$$v = \sum_{b}^{B} H_b \sum_{k}^{K} \tilde{c}_{b,k} + \eta \qquad \text{Equation 1}$$

wherein $\tilde{c}_{b,k}$ denotes a combined chip/symbol vector transmitted from the $b^{th}$ base station to the $k^{th}$ UE, $H_b$ denotes a multipath channel matrix of the $b^{th}$ base station, and $\eta$ denotes a noise vector. The average received power per chip from the $b^{th}$ base station to the $k^{th}$ UE is $$E_{b,k} = E|\tilde{c}_{b,k,t}|^2|,$$

where t refers to a particular chip in the vector.

Each column of $H_b$ represents the multipath waveform of a different respective chip. Since the multipath channel is substantially constant over a small time window, the columns of $H_b$ are identical (excluding the edge elements) but shifted vertically by one element for each successive chip. Thus, matrix $H_b$ has a Toeplitz structure in an embodiment.

Without loss of generality, the description that follows assumes that the received signal is processed at the chip rate, i.e., at a single sample per chip. A processing window of N chips is assumed, i.e., the length of vector v is N.

For the case of two antennas, as in FIG. 1, vector v can be written as $$v = \begin{bmatrix} v_1 \\ v_2 \end{bmatrix},$$

wherein $v_1$ and $v_2$ denote the received samples from antennas 24A and 24B (i.e., from the first and second receiver chains), respectively. Similarly, matrix $H_b$ can be written as $$H_b = \begin{bmatrix} H_{b,1} \\ H_{b,2} \end{bmatrix},$$

wherein $H_{b,1}$ and $H_{b,2}$ denote the multipath channel matrix for antennas 24A and 24B, respectively. The noise vector $\eta$ in this case similarly comprises the noise sample vectors for the two antennas, stacked one above the other. The noise is assumed to be Additive White Gaussian Noise (AWGN) with variance $\sigma_i^2$ for the $i^{th}$ antenna. This notation can be generalized in a similar manner to any desired number of antennas.

In an embodiment, equalizer tap calculation unit 72 calculates a vector w of taps for equalizer 44, so as to minimize the mean square error given by Equation 2:

$$\min E|\tilde{c}_{b0,k0,t} - w^H v|^2 \qquad \text{Equation 2}$$

wherein $\tilde{c}_{b0,k0,t}$ denotes the combined chip/symbol value for the desired UE denoted k0 from base station b0 at delay t. Vector $w^H = [w_1^H \ w_2^H]$ denotes the equalizer tap vectors for the two antennas (i.e., for the two receiver chains). In the notation above, $(\ )^H$ denotes Hermitian transpose and E denotes statistical expectation.

The vector w that solves equation 2, in an embodiment, is given by

Equation 3:

$$w = E[vv^H]^{-1} E[vc^*_{b0,k0,t}] = R^{-1}_{vv} H\delta_t =$$

$$\begin{pmatrix} E[v_1 v_1^H] & E[v_1 v_2^H] \\ E[v_2 v_1^H] & E[v_2 v_2^H] \end{pmatrix}^{-1} \begin{bmatrix} h_{t,1} \\ h_{t,2} \end{bmatrix} \approx \begin{pmatrix} R_{11} & R_{12} \\ R_{21} & R_{22} \end{pmatrix}^{-1} \begin{bmatrix} \tilde{h}_{t,1} \\ \tilde{h}_{t,2} \end{bmatrix}$$

wherein $R_{vv}$ is a positive-definite Hermitian matrix in which each of the blocks $R_{ij}$ ($R_{11}, R_{12}, R_{21}, R_{22}$) is Toeplitz, $R_{ij}$ are the estimated sub-matrices of $R_{vv}$, H denotes the channel matrix for the desired base station, $\delta_t$ denotes a selector vector (all-zeros except for the $t^{th}$ element that is equal to unity), $$h_t = \begin{bmatrix} h_{t,1} \\ h_{t,2} \end{bmatrix}$$

denotes the chip-spaced channel waveform for the two antennas for the chip at delay t, and $\tilde{h}_{t,1}$, $\tilde{h}_{t,2}$ denote the channel estimation, i.e., estimates of the channel response waveform for the two antennas, respectively.

The equations above do not involve any diagonal loading. When processing circuitry 32 applies uniform diagonal loading, i.e., non-antenna-specific diagonal loading, the equalizer tap vector can be written as Equation 4:

$$w = \left( \begin{bmatrix} R_{11} & R_{12} \\ R_{21} & R_{22} \end{bmatrix} + dI \right)^{-1} \begin{bmatrix} \tilde{h}_{t,1} \\ \tilde{h}_{t,2} \end{bmatrix}$$

wherein d denotes a loading factor and I denotes a 2×2 identity matrix.

The signal at the output of equalizer 44 is given by

Equation 5:

$$y = w^H v$$

When processing circuitry 32 applies antenna-specific diagonal loading, the equalizer tap vector can be written as Equation 6:

$$w = \left( \begin{bmatrix} R_{11} + \tilde{d}_1 I & R_{12} \\ R_{21} & R_{22} + \tilde{d}_2 I \end{bmatrix} \right)^{-1} \begin{bmatrix} \tilde{h}_{t,1} \\ \tilde{h}_{t,2} \end{bmatrix}$$

wherein $\tilde{d}_1$ denotes a loading factor for the diagonal elements associated with the first antenna (antenna 24A), and $\tilde{d}_2$ denotes a loading factor for the diagonal elements associated with the second antenna (antenna 24B).

In various embodiments, diagonal loading calculation unit 64 chooses the loading values $\tilde{d}_1$ and $\tilde{d}_2$ based on various criteria, e.g., depending on the antenna-specific gain of AGC units 36A and 36B (also referred to as power gain), depending on received noise power in the different antennas, depending on the noise variance in a receiver chain of the respective antenna, depending on received Signal-to-Noise Ratios (SNRs) in the different antennas, or based on any other suitable antenna-specific criterion. In addition, the choice of $\tilde{d}_1$ and $\tilde{d}_2$ may also depend on the overall quality of the output of equalizer 44.

As noted above, in some embodiments UE 20 applies dual-AGC, i.e., sets the gain of AGC units 36A and 36B (denoted $G_1$ and $G_2$, respectively independently of one another. Typically, $G_1$ and $G_2$ are adjusted so that the signals received from antennas 24A and 24B are set at a certain level relative to the full-scale of ADCs 40A and 40B, respectively. Thus, a stronger received signal will cause a smaller AGC gain, and vice versa.

When using uniform diagonal loading, the output of equalizer 44 in these embodiments can be written as Equation 7:

$$y = [G_1 \tilde{h}^H_{t,1} G_2 \tilde{h}^H_{t,2}] \begin{bmatrix} G_1^2 R_{11} + dI & G_1 G_2 R_{12} \\ G_1 G_2 R_{21} & G_2^2 R_{22} + dI \end{bmatrix}^{-1} \begin{bmatrix} G_1 v_1 \\ G_2 v_2 \end{bmatrix} =$$

$$\ldots = [\tilde{h}^H_{t,1} \tilde{h}^H_{t,2}] \begin{bmatrix} R_{11} + \frac{d}{G_1^2} I & R_{12} \\ R_{21} & R_{22} + \frac{d}{G_2^2} I \end{bmatrix}^{-1} \begin{bmatrix} v_1 \\ v_2 \end{bmatrix}$$

Equation 7 shows that, although the AGC-adjusted signal correlation matrix $\tilde{R}_{vv}$ was loaded with a uniform (non-antenna-specific) diagonal loading factor d, the independent operation of the two AGC units effectively caused the diagonal loading of the underlying $R_{vv}$ matrix to differ between the antennas. The resulting antenna-specific diagonal loading value for the $i^{th}$ antenna is given by Equation 8:

$$D_i = \frac{d}{G_i^2}$$

When applying a single-AGC approach, on the other hand, the gain of both AGC units 36A and 36B is set to the same value denoted G. In an example embodiment, $G = \min\{G_1, G_2\}$. In this embodiment the diagonal loading of $R_{vv}$ is uniform:

Equation 9:

$$D = \frac{d}{G^2}$$

The above-described impact of dual-AGC operation on the diagonal loading may cause considerable degradation in the performance of equalizer tap calculation. The degradation can be noticeable in various scenarios and is particularly severe, for example, in the presence of flat (frequency non-selective) fading and AWGN.

Consider, for example, a single-path fading scenario with AWGN. In this scenario it is possible to reduce the equalizer observation window to a single chip, i.e., N=1. Also, without loss of generality we normalize the average received power for each antenna to unity. In this case it can be shown that Equation 10:

$$R_{vv} = \begin{bmatrix} |h_1|^2 + \sigma_1^2 & h_1 h_2^* \\ h_1^* h_2 & |h_2|^2 + \sigma_2^2 \end{bmatrix} \approx \begin{bmatrix} |\tilde{h}_1|^2 + \sigma_1^2 & \tilde{h}_1 \tilde{h}_2^* \\ \tilde{h}_1^* \tilde{h}_2 & |\tilde{h}_2|^2 + \sigma_2^2 \end{bmatrix}$$

wherein $h_i$ and $\tilde{h}_i$ denote the actual and estimated channel tap values for the $i^{th}$ antenna (without AGC gain factors), and $R_{vv}$ is a 2×2 matrix. The signal covariance matrix is approximated using the channel estimates for each antenna.

The chip output of equalizer 44 can thus be written as Equation 11:

$$y = [\tilde{h}_1^* \; \tilde{h}_2^*] \begin{bmatrix} |\tilde{h}_1|^2 + \sigma_1^2 + \frac{d}{G_1^2} & \tilde{h}_2^* \tilde{h}_1 \\ \tilde{h}_1^* \tilde{h}_2 & |\tilde{h}_2|^2 + \sigma_2^2 + \frac{d}{G_2^2} \end{bmatrix}^{-1} \begin{bmatrix} v_1 \\ v_2 \end{bmatrix} =$$

$$K_0 \begin{bmatrix} \frac{\tilde{h}_1^*}{\sigma_1^2 + \frac{d}{G_1^2}} & \frac{\tilde{h}_2^*}{\sigma_2^2 + \frac{d}{G_2^2}} \end{bmatrix} \begin{bmatrix} v_1 \\ v_2 \end{bmatrix}$$

wherein $K_0$ denotes a scaling factor that is common to both antennas 24A and 24B.

Assume, for simplicity, that the received noise variance is similar in the two antennas, i.e., $\sigma_1^2 \approx \sigma_2^2$. In the single-AGC case ($G_1 = G_2 = G$) it can be seen from Equation 11 that the diagonal loading does not degrade the maximum-ratio combining. In the dual-AGC case, however, the diagonal loading enhances the modeled noise for the antenna having the stronger received signal (antenna with lower $G_i$) and decreases the modeled noise for the other antenna. This effect deviates from the optimal maximum-ratio combining and thus degrades performance.

In some embodiments, proper choice of antenna-specific diagonal loading values compensates for this undesired effect of the dual AGC. In an embodiment, processing circuitry 32 applies a different diagonal loading value for each antenna for the AGC-adjusted covariance matrix $\tilde{R}_{vv}$:

Equation 12:

$$\tilde{d}_i = d G_i^2$$

wherein $i \in \{1,2\}$ denotes the antenna index.

Replacing d with $\tilde{d}$ in Equation 8 shows that this choice of loading values (after AGC) effectively applies a constant (non-antenna-specific) loading value to the diagonal elements of $R_{vv}$:

Equation 13:

$$D_i = \frac{\tilde{d}}{G_i^2} = d$$

In other words, in this embodiment both sub-blocks of $R_{vv}$ are enlarged by the same diagonal loading value, similarly to the single-AGC case. This solution provides high performance in various scenarios, for example in AWGN scenarios with channels whose multipath resembles flat fading. Examples of such scenarios are the One-Path channel and the ITU Pedestrian A channel. Note also that Equations 12 and 13, as well as the above-described mechanism, can be generalized from the two-antenna case to any desired number of antennas: When using an independent AGC per antenna, then scaling each diagonal loading value by the square of the AGC gain per antenna is equivalent to adding a constant diagonal value to the underlying (non-AGC-adjusted) signal covariance matrix.

In alternative embodiments, processing circuitry 32 calculates each diagonal loading value depending on the noise variance of the respective antenna. In these embodiments there is no assumption that the noise variance per antenna is similar. Rewriting Equation 11 for this case gives:

Equation 14:

$$[w_1^* \; w_2^*] = K_0 \left[ \frac{\tilde{h}_1^*}{\sigma_1^2} \left( \frac{\sigma_1^2}{\sigma_1^2 + \frac{\tilde{d}_1}{G_1^2}} \right) \; \frac{\tilde{h}_2^*}{\sigma_2^2} \left( \frac{\sigma_2^2}{\sigma_2^2 + \frac{\tilde{d}_2}{G_2^2}} \right) \right]$$

wherein the constant d is replaced with the antenna-specific $\tilde{d}$ values. In order to maintain maximum-ratio combining it is necessary to meet:

Equation 15:

$$\frac{\sigma_1^2}{\sigma_1^2 + \frac{\tilde{d}_1}{G_1^2}} = \frac{\sigma_2^2}{\sigma_2^2 + \frac{\tilde{d}_2}{G_2^2}}$$

or

Equation 16:

$$\tilde{d}_2 = \tilde{d}_1 \frac{G_2^2}{G_1^2} \frac{\sigma_2^2}{\sigma_1^2}$$

Equation 16 thus gives the choice of diagonal loading values per antenna as a function of the respective AGC gains and noise variances, in an embodiment. This choice provides high performance in various channel scenarios, e.g., flat fading with AWGN, in both dual-AGC and single-AGC implementations.

In some embodiments, processing circuitry 32 does not have a-priori knowledge of the noise variances. Instead, the processing circuitry estimates the ratio between the noise variances. The ratio can be estimated, for example, using the long-term average of the squared AGC gain values:

Equation 17:

$$\frac{\sigma_2^2}{\sigma_1^2} \approx \frac{E[G_1^2]}{E[G_2^2]}$$

The estimate of Equation 17 performs well, for example, when one of the antennas has an additional attenuation that equally affects both signal and noise. This scenario occurs, for example, if the predominant noise represents interference received over the air, rather than noise that is internal to the receiver. An imbalance between antennas may arise, for example, if the receiver is implemented with one antenna of considerably poorer quality than the other.

In some embodiments, the diagonal loading values depend on the actual values of the diagonal elements of the AGC-adjusted signal covariance matrix $\tilde{R}hd\,vv$. The $i^{th}$ diagonal block of $\tilde{R}_{vv}$ contains the signal power in the $i^{th}$ antenna (the zero-lag term in the signal autocorrelation) and is denoted $I_{0,i}$. For an ideal dual AGC, both $I_{0,i}$ values would be identical and equal to some desired power level.

One possible solution of this sort is to set the diagonal loading value for the AGC-adjusted signal correlation matrix to be Equation 18:

$$d = \lambda_{DL}\max\{I_{0,1}, I_{0,2}\}$$

wherein $\lambda_{DL}$ denotes a diagonal loading factor that typically varies depending on received signal conditions.

As explained above, however, the effective loading value added to $R_{vv}$ by such uniform loading is actually Equation 19:

$$D_i = \frac{\lambda_{DL}\max\{I_{0,1}, I_{0,2}\}}{G_i^2}$$

for the $i^{th}$ antenna in the dual-AGC case, and

Equation 20:

$$D = \frac{\lambda_{DL}\max\{I_{0,1}, I_{0,2}\}}{G^2}$$

in the single-AGC case.

In order to ensure that the $D_i$ values are identical to one another in the dual-AGC case, in some embodiments processing circuitry 32 sets the following diagonal loading values:

Equation 21:

$$\tilde{d}_i = d\frac{G_i^2}{\min\{G_1^2, G_2^2\}} = \lambda_{DL}\max\{I_{0,1}, I_{0,2}\}\frac{G_i^2}{\min\{G_1^2, G_2^2\}}$$

This setting leads to

Equation 22:

$$D_i = \frac{\lambda_{DL}\max\{I_{0,1}, I_{0,2}\}}{\min\{G_1^2, G_2^2\}}$$

for the $i^{th}$ antenna in the dual-AGC case.

Equation 22 is identical to Equation 20 for the single-AGC case, for the typical case in which the single-AGC is set to $G = \min\{G_1, G_2\}$. In comparison with Equation 12 above, the expression of Equation 22 is simpler to implement, especially when using fixed-point calculations.

The calculation above assumes that the noise variance is substantially the same in the two antennas. In an alternative embodiment that takes into account different noise variances, processing circuitry 32 sets the following diagonal loading values:

Equation 23:

$$\tilde{d}_i = \begin{cases} \lambda_{DL}\max\{I_{0,1}, I_{0,2}\}\frac{G_i^2}{\min\{G_1^2, G_2^2\}}\frac{\sigma_i^2}{\max\{\sigma_1^2, \sigma_2^2\}} & \text{dual } AGC \\ \lambda_{DL}\max\{I_{0,1}, I_{0,2}\}\frac{\sigma_i^2}{\max\{\sigma_1^2, \sigma_2^2\}} & \text{single } AGC \end{cases}$$

In some embodiments, processing circuitry 32 handles the adaptation and antenna-specific loading of the diagonal elements of $R_{vv}$ as two separate tasks. In an example embodiment, processing circuitry 32 adapts a single diagonal loading value (e.g., $\lambda_{DL}$ or d), for example based on the SNR of the equalized signal at the output of equalizer 44. This adapted value is then scaled or otherwise loaded per antenna, for example based on the respective AGC gain and/or noise variance (e.g., according to Equation 23). Since it is simpler to adapt a single value than to run multiple adaptation loops, the separation between adaptation and antenna-specific loading both reduces computational complexity and increases robustness.

In the example implementation of FIG. 1, adaptation is performed by adaptive diagonal loading calculation unit 76, and antenna-specific loading calculation is performed by diagonal loading calculation unit 64. In such an implementation, unit 76 typically receives the values of the one or more of the diagonal elements of $R_{vv}$ from signal covariance matrix estimation unit 56.

Adaptive diagonal loading calculation unit 76 may carry out any suitable adaptation process. Adaptation processes of this sort are addressed, for example, in U.S. Pat. No. 8,098,717, entitled "Hybrid Equalizer," which is assigned to the assignee of the present patent application and whose disclosure is incorporated herein by reference.

In an example adaptation process, equalizer 44 equalizes the received signal based on two diagonal loading values ($\lambda_{DL}$ values) denoted $\lambda_{DL,High}$ and $\lambda_{DL,Low}$, wherein $\lambda_{DL,High} > \lambda_{DL,Low}$. Processing circuitry 32 then computes the SNR of the equalized signal for the two $\lambda_{DL}$ values, to produce $SNR_{High}$ and $SNR_{Low}$, respectively. The processing circuitry averages over the SNR differences, to determine the direction in which to adapt $\lambda_{DL}$:

Equation 24:

$$\text{Delta}(n) = \text{Delta}(n-1) + K[\text{SNR}_{Low}(n) - \text{SNR}_{High}(n)]$$

wherein K denotes a loop gain factor.

When Delta(n) exceeds a predefined positive threshold, the processing circuitry decides that $\lambda_{DL,Low}$ performs better than $\lambda_{DL,High}$, and therefore decreases both $\lambda_{DL,High}$ and $\lambda_{DL,Low}$ by some step size. Delta(n) is then reset to zero, and the adaptation continues to the next iteration. When Delta(n) drops below a predefined negative threshold, the processing circuitry decides that $\lambda_{DL,High}$ performs better than $\lambda_{DL,Low}$, and therefore increases both $\lambda_{DL,High}$ and $\lambda_{DL,Low}$ by some step size. Delta(n) is again reset to zero, and the adaptation continues to the next iteration.

In some embodiments, processing circuitry 32 switches between a first mode in which the diagonal elements of $R_{vv}$ are loaded with antenna-specific loading values, and a second mode in which the diagonal elements of $R_{vv}$ are loaded with loading values that are not antenna-specific. The processing circuitry switches between the two modes depending on some signal criterion. For example, if antenna-specific diagonal loading is implemented based on Equation 21 (and not Equation 23), but a large potential noise imbalance is detected between the antennas, it may be preferable to revert to diagonal loading that is not antenna specific.

Figure 3:
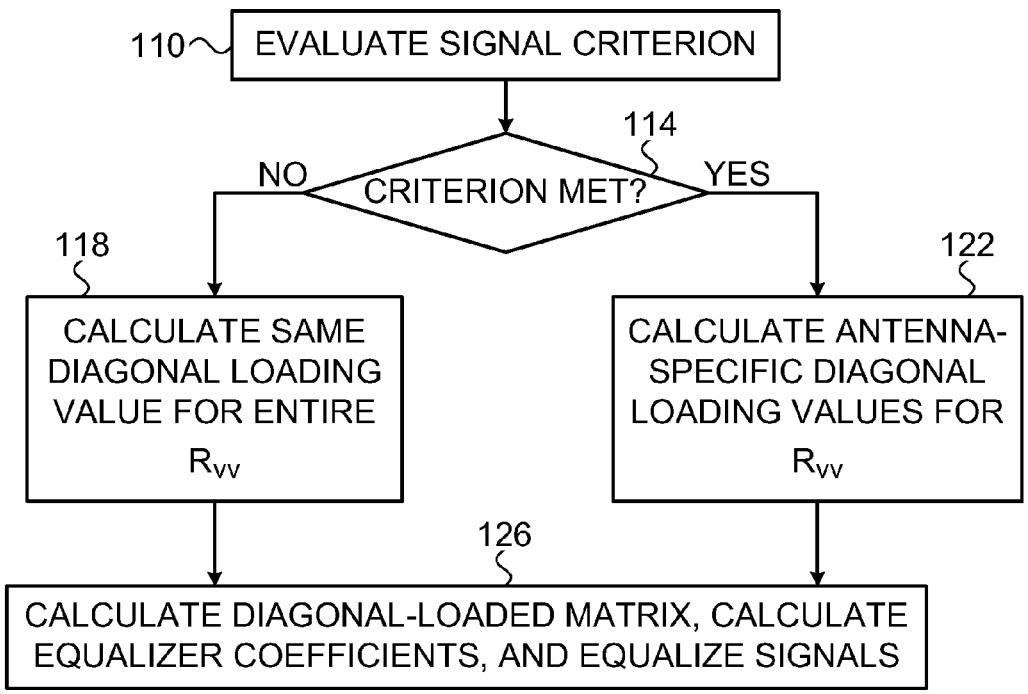
FIG. 3 is a flow chart that schematically illustrates a method for signal reception and equalization using adaptive diagonal loading, in accordance with an embodiment that is described herein.

FIG. 3 is a flow chart that schematically illustrates a method for signal reception and equalization using adaptive diagonal loading, in accordance with an embodiment that is described herein. The method begins with processing circuitry evaluating a criterion relating to the received signal, at a criterion evaluation operation 110. In an embodiment, as noted above, the processing circuitry estimates the noise imbalance between different receive antennas and compares the imbalance to some predefined threshold. Alternatively, any other suitable criterion can be evaluated.

The processing circuitry checks whether the criterion is met, at a checking operation 114. If the criterion is not met, processing circuitry 32 calculates and sets the same diagonal loading for all diagonal elements of the signal covariance matrix, at a non-antenna-specific loading operation 118. If the signal criterion is met, on the other hand, processing circuitry 32 calculates and sets diagonal loading separately for each antenna, at an antenna-specific loading operation 122.

The processing circuitry then calculates the loaded signal covariance matrix, calculates the taps of equalizer 44 using the loaded matrix, and equalizes the received signal using equalizer 44, at a calculation & equalization operation 126.

Additionally or alternatively to the above mode switching, in some embodiments processing circuitry 32 is capable of selectively switching off diagonal loading altogether upon meeting some criterion.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a mobile communication terminal, receiving downlink signals from at least two antennas;
   calculating a signal covariance matrix for the received signals;
   enlarging each diagonal element of the signal covariance matrix by a respective antenna-specific value that depends on a respective antenna associated with the diagonal element;
   computing equalizer coefficients based on the signal covariance matrix having the enlarged diagonal elements; and
   equalizing the received downlink signals using the equalizer coefficients.

2. The method according to claim 1, wherein enlarging each diagonal element by an antenna-specific value that depends on the respective antenna comprises calculating the antenna-specific value for each of the antennas independently of any other of the antennas.

3. The method according to claim 1, wherein enlarging each diagonal element comprises scaling each diagonal element by a factor that is proportional to a power gain of the respective antenna.

4. The method according to claim 1, wherein enlarging each diagonal element comprises scaling each diagonal element by a factor that depends on a noise variance in a receiver chain of the respective antenna.

5. The method according to claim 1, wherein receiving the downlink signals comprises applying Automatic Gain Control (AGC) independently for each antenna so as to produce gain-controlled signals, and wherein calculation of the signal covariance matrix and equalization of the downlink signals are performed on the gain-controlled signals.

6. The method according to claim 1, wherein enlarging each diagonal element comprises adapting a single diagonal loading factor based on the equalized downlink signals, and setting each diagonal element by scaling the adapted diagonal loading factor by the antenna-specific value that depends on the respective antenna.

7. The method according to claim 1, comprising evaluating a predefined criterion and deciding, based on the criterion, to switch to a mode in which all diagonal elements of the signal covariance matrix are enlarged by a same value.

8. The method according to claim 1, comprising evaluating a predefined criterion and deciding, based on the criterion, to switch to a mode in which all diagonal elements of the signal covariance matrix are not enlarged.

9. Apparatus, comprising:
   a receiver front-end, which is configured to receive downlink signals from at least two antennas; and
   processing circuitry, which is configured to calculate a signal covariance matrix for the received signals, to enlarge each diagonal element of the signal covariance matrix by a respective antenna-specific value that depends on a respective antenna associated with the diagonal element, to compute equalizer coefficients based on the signal covariance matrix having the enlarged diagonal elements, and to equalize the received downlink signals using the equalizer coefficients.

10. The apparatus according to claim 9, wherein the processing circuitry is configured to calculate the antenna-specific value for each of the antennas independently of any other of the antennas.

11. The apparatus according to claim 9, wherein the processing circuitry is configured to scale each diagonal element by a factor that is proportional to a power gain of the respective antenna.

12. The apparatus according to claim 9, wherein the processing circuitry is configured to scale each diagonal element by a factor that depends on a noise variance in a receiver chain of the respective antenna.

13. The apparatus according to claim 9, wherein the processing circuitry is configured to apply Automatic Gain Control (AGC) independently for each antenna so as to produce gain-controlled signals, and to perform calculation of the signal covariance matrix and equalization of the downlink signals on the gain-controlled signals.

14. The apparatus according to claim 9, wherein the processing circuitry is configured to adapt a single diagonal loading factor based on the equalized downlink signals, and to set each diagonal element by scaling the adapted diagonal loading factor by the antenna-specific value that depends on the respective antenna.

15. The apparatus according to claim 9, wherein the processing circuitry is configured to evaluate a predefined criterion and to decide, based on the criterion, to switch to a mode in which all diagonal elements of the signal covariance matrix are enlarged by a same value.

16. The apparatus according to claim 9, wherein the processing circuitry is configured to evaluate a predefined criterion and to decide, based on the criterion, to switch to a mode in which all diagonal elements of the signal covariance matrix are not enlarged.

17. A mobile communication terminal comprising the apparatus of claim 9.

18. A chipset for processing signals in a mobile communication terminal, comprising the apparatus of claim 9.

19. A method, comprising:
   in a mobile communication terminal, receiving downlink signals from at least two antennas;
   calculating a signal covariance matrix for the received signals;
   evaluating a predefined criterion and choosing, based on the criterion, between:
      enlarging each diagonal element of the signal covariance matrix by a respective antenna-specific value that depends on a respective antenna associated with the diagonal element; and enlarging each diagonal element of the signal covariance matrix regardless of the respective antenna associated with the diagonal element;

computing equalizer coefficients based on the signal covariance matrix having the enlarged diagonal elements; and equalizing the received downlink signals using the equalizer coefficients.

20. Apparatus, comprising:

a receiver front-end, which is configured to receive downlink signals from at least two antennas; and processing circuitry, which is configured to calculate a signal covariance matrix for the received signals, to evaluate a predefined criterion, to choose, based on the criterion, between enlarging each diagonal element of the signal covariance matrix by a respective antenna-specific value that depends on a respective antenna associated with the diagonal element, and between enlarging each diagonal element of the signal covariance matrix regardless of the respective antenna associated with the diagonal element, to compute equalizer coefficients based on the signal covariance matrix having the enlarged diagonal elements, and to equalize the received downlink signals using the equalizer coefficients.

* * * * *